United States Patent
Yang et al.

(10) Patent No.: US 10,142,978 B2
(45) Date of Patent: Nov. 27, 2018

(54) METHOD AND APPARATUS FOR TRANSMITTING CONTROL INFORMATION IN WIRELESS COMMUNICATION SYSTEM

(71) Applicant: LG ELECTRONICS INC., Seoul (KR)

(72) Inventors: Suckchel Yang, Seoul (KR); Joonkui Ahn, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 5 days.

(21) Appl. No.: 15/123,596

(22) PCT Filed: Mar. 6, 2015

(86) PCT No.: PCT/KR2015/002185
§ 371 (c)(1),
(2) Date: Sep. 2, 2016

(87) PCT Pub. No.: WO2015/133861
PCT Pub. Date: Sep. 11, 2015

(65) Prior Publication Data
US 2017/0079014 A1 Mar. 16, 2017

Related U.S. Application Data

(60) Provisional application No. 61/948,568, filed on Mar. 6, 2014.

(51) Int. Cl.
*H04W 72/04* (2009.01)
*H04J 11/00* (2006.01)
*H04L 5/14* (2006.01)

(52) U.S. Cl.
CPC ....... *H04W 72/042* (2013.01); *H04J 11/0023* (2013.01); *H04L 5/14* (2013.01); *H04W 72/0446* (2013.01)

(58) Field of Classification Search
CPC ............. H04W 72/042; H04W 72/0446; H04J 11/0023; H04L 5/14
See application file for complete search history.

(56) References Cited

U.S. PATENT DOCUMENTS

| | | | |
|---|---|---|---|
| 2015/0092624 A1* | 4/2015 | Yao | H04L 5/0055 370/278 |
| 2017/0034808 A1* | 2/2017 | Ouchi | H04W 72/042 |

OTHER PUBLICATIONS

3rd Generation Partnership Project (3GPP), "Technical Specification Group Radio Access Network; Evolved Universal Terrestrial Radio Access (E-UTRA); Physical channels and modulation (Release 12)," 3GPP TR 36.211 V12.0.0, Dec. 2013, 120 pages.

(Continued)

*Primary Examiner* — Ian N Moore
*Assistant Examiner* — Ronald H Davis
(74) *Attorney, Agent, or Firm* — Lee Hong Degerman Kang & Waimey (57) ABSTRACT

The present invention relates to a wireless communication system. Specifically, the present invention provides a method for controlling signal transmission and reception by a terminal in a situation in which simultaneous transmission and reception is restricted, and an apparatus therefor, the method comprising the steps of: configuring a PCell and an SCell; and restricting signal transmission and reception on the SCell in an subframe when the PCell and the SCell have different transmission directions in the subframe, wherein the transmission direction of the SCell is defined according to first UL-DL information in an SIB when the SCell is not an eIMTA cell, and the transmission direction of the SCell is defined according to second UL-DL configuration information in a PDCCH when the SCell is the eIMTA cell.

10 Claims, 8 Drawing Sheets

(56) References Cited

OTHER PUBLICATIONS

Samsung, "Dynamic reconfiguration of TDD UL-DL configuration," 3GPP TSG-RAN WG1 #69, R1-122267, May 2012, 2 pages.
LG Electronics, "HARQ timing for TDD-FDD carrier aggregation," 3GPP TSG-RAN WG1 #74, R1-134396, Sep. 2013, 6 pages.
LG Electronics, "DL HARQ timing for TDD-FDD carrier aggregation with self-carrier scheduling," 3GPP TSG-RAN WG1 #76, R1-140310, Feb. 2014, 8 pages.
PCT International Application No. PCT/KR2015/002185, Written Opinion of the International Searching Authority dated May 15, 2015, 21 pages.
Ericsson, "HARQ and scheduling timing for eIMTA," 3GPP TSG-RAN WG1 #74, R1-133418, Aug. 2013, 4 pages.
Sharp, "Support of non simultaneous Rx/Tx capable UEs for TDD-FDD carrier aggregation," 3GPP TSG RAN WG1 Meeting #76, R1-140644, Feb. 10-14, 2014, 4 pages.
Samsung, "On HARQ operation for TDD UL-DL reconfiguration," 3GPP TSG-RAN WG1 #72bis, R1-131013, Apr. 15-19, 2013, 4 pages.

\* cited by examiner

METHOD AND APPARATUS FOR TRANSMITTING CONTROL INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2015/002185, filed on Mar. 6, 2015, which claims the benefit of U.S. Provisional Application No. 61/948,568, filed on Mar. 6, 2014, the contents of which are all hereby incorporated by reference herein in their entirety.

TECHNICAL FIELD

The present invention relates to a wireless communication system and, more particularly, to a method for transmitting control information in a wireless communication system and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Problem

An object of the present invention is to provide a method for transmitting/receiving control information in a wireless communication system and an apparatus for the same.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of controlling transmission and reception of a signal, which is controlled by a user equipment in a situation in which simultaneous transmission and reception is restricted in a plurality of cells in a wireless communication system, includes the steps of configuring an PCell (primary cell) and an SCell (secondary cell) and, if transmission direction of the PCell and transmission direction of the SCell are different from each other in a subframe, restricting signal transmission and reception on the SCell of the subframe. In this case, if the SCell is not an eIMTA (enhanced interference mitigation and traffic adaptation) cell, the transmission direction of the SCell can be defined according to first UL-DL (uplink-downlink) information in an SIB (system information block). If the SCell corresponds to the eIMTA cell, the transmission direction of the SCell can be defined according to second UL-DL configuration information of PDCCH (physical downlink control channel).

To further achieve these and other advantages and in accordance with the purpose of the present invention, according to a different embodiment, a UE configured to control transmission and reception of a signal in a situation in which simultaneous transmission and reception is restricted in a plurality of cells in a wireless communication system includes an RF (radio frequency) unit and a processor, the processor configured to configure an PCell (primary cell) and an SCell (secondary cell), the processor, if transmission direction of the PCell and transmission direction of the SCell are different from each other in a subframe, configured to restrict signal transmission and reception on the SCell of the subframe. In this case, if the SCell is not an eIMTA (enhanced interference mitigation and traffic adaptation) cell, the transmission direction of the SCell can be defined according to first UL-DL (uplink-downlink) information in an SIB (system information block). If the SCell corresponds to the eIMTA cell, the transmission direction of the SCell can be defined according to second UL-DL configuration information of PDCCH (physical downlink control channel).

Preferably, if the PCell corresponds to a DL subframe and the SCell corresponds to a UL subframe or a special subframe in the subframe, UL signal transmission can be restricted in the SCell of the subframe.

Preferably, if the PCell corresponds to a UL subframe and the SCell corresponds to a DL subframe in the subframe, DL signal reception can be restricted in the SCell of the subframe.

Preferably, if the PCell corresponds to a special subframe and the SCell corresponds to a DL subframe in the subframe, reception of PCFICH (physical control format indicator channel), PHICH (physical hybrid ARQ indicator channel), and PDCCH can be permitted only in the SCell of the subframe.

Preferably, the PCell may correspond to a FDD (frequency division duplex) cell and the SCell may correspond to a TDD (time division duplex) cell.

Preferably, the PCell may correspond to a TDD cell and the SCell may correspond to a TDD cell.

Preferably, a subframe pattern of a cell can be allocated as follows according to a UL-DL configuration.

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Advantageous Effects

According to the present invention, it is possible to efficiently transmit/receive control information in a wireless communication system.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

In a wireless communication system, a user equipment (UE) receives information from a base station (BS) on downlink (DL) and transmits information to the BS on uplink (UL). In LTE(-A), DL transmission is performed using OFDMA and uplink transmission is performed using single carrier frequency division multiple access (SC-FDMA).

Figure 1:
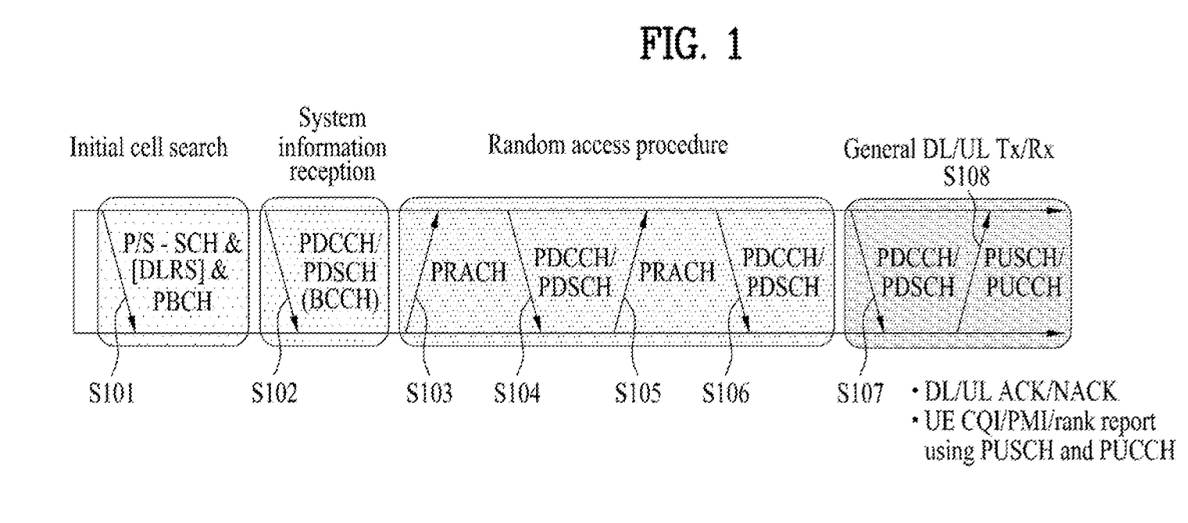
FIG. 1 illustrates physical channels and a general signal transmission method using the physical channels in LTE-(A) system.

FIG. 1 illustrates physical channels and a general method for transmitting signals on the physical channels in an LTE(-A) system.

Referring to FIG. 1, when a User Equipment (UE) is powered on or enters a new cell, the UE performs initial cell search in step S101. The initial cell search involves acquisition of synchronization to an evolved Node B (eNB). Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information (i.e., a Master Information Block (MIB)) broadcast in the cell by receiving a Physical Broadcast Channel (PBCH) from the eNB. During the initial cell search, the UE may monitor a Downlink (DL) channel state by receiving a DownLink Reference Signal (DL RS).

After the initial cell search, the UE acquires detailed system information (i.e. a System Information Block (SIB)) by receiving a Physical Downlink Control Channel (PDCCH) and receiving a Physical Downlink Shared Channel (PDSCH) based on information included in the PDCCH in step S102.

Then, the UE may perform a random access procedure with the eNB to complete the connection to the eNB in step S103 to S106. In the random access procedure, the UE may transmit a preamble on a Physical Random Access Channel (PRACH) (S103) and may receive a response message to the preamble on a PDCCH and a PDSCH associated with the PDCCH (S104). In the case of contention-based random access, the UE additionally performs a contention resolution procedure including transmission of a Physical Uplink Shared Channel (PUSCH) (S105) and reception of a PDCCH and its associated PDSCH (S106).

After the above procedure, the UE may receive a PDCCH/PDSCH (S107) and transmit a PUSCH/PUCCH (S108) in a general UL/DL signal transmission procedure.

Figure 2:
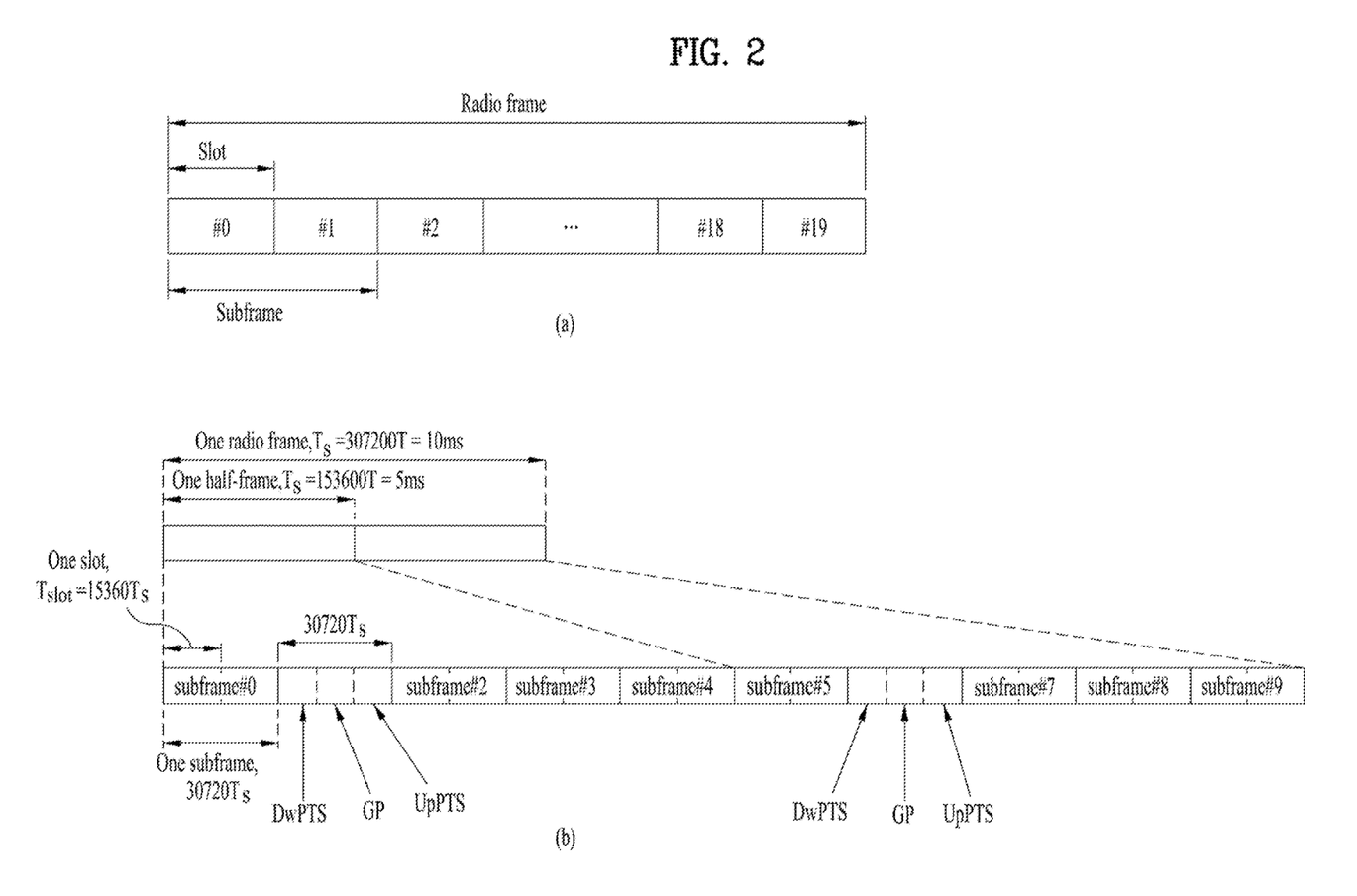
FIG. 2 illustrates a radio frame structure.

FIG. 2 illustrates a radio frame structure.

FIG. 2(a) illustrates a type-1 radio frame structure for frequency division duplex (FDD). A radio frame includes a plurality of (e.g. 10) subframes each of which includes a plurality of (e.g. 2) slots in the time domain. Each subframe has a duration of 1 ms and each slot has a duration of 0.5 ms. A slot includes a plurality of OFDM/SC-FDMA symbols in the time domain and includes a plurality of resource blocks (RBs) in the frequency domain.

FIG. 2(b) illustrates a type-2 radio frame structure for time division duplex (TDD). The type-2 radio frame includes 2 half frames. Each half frame includes 5 subframes each of which includes 2 slots.

Table 1 shows UL-DL configurations (Uplink-Downlink Configuration, UL-DL Cfg또는 UD-cfg) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission.

Figure 3:
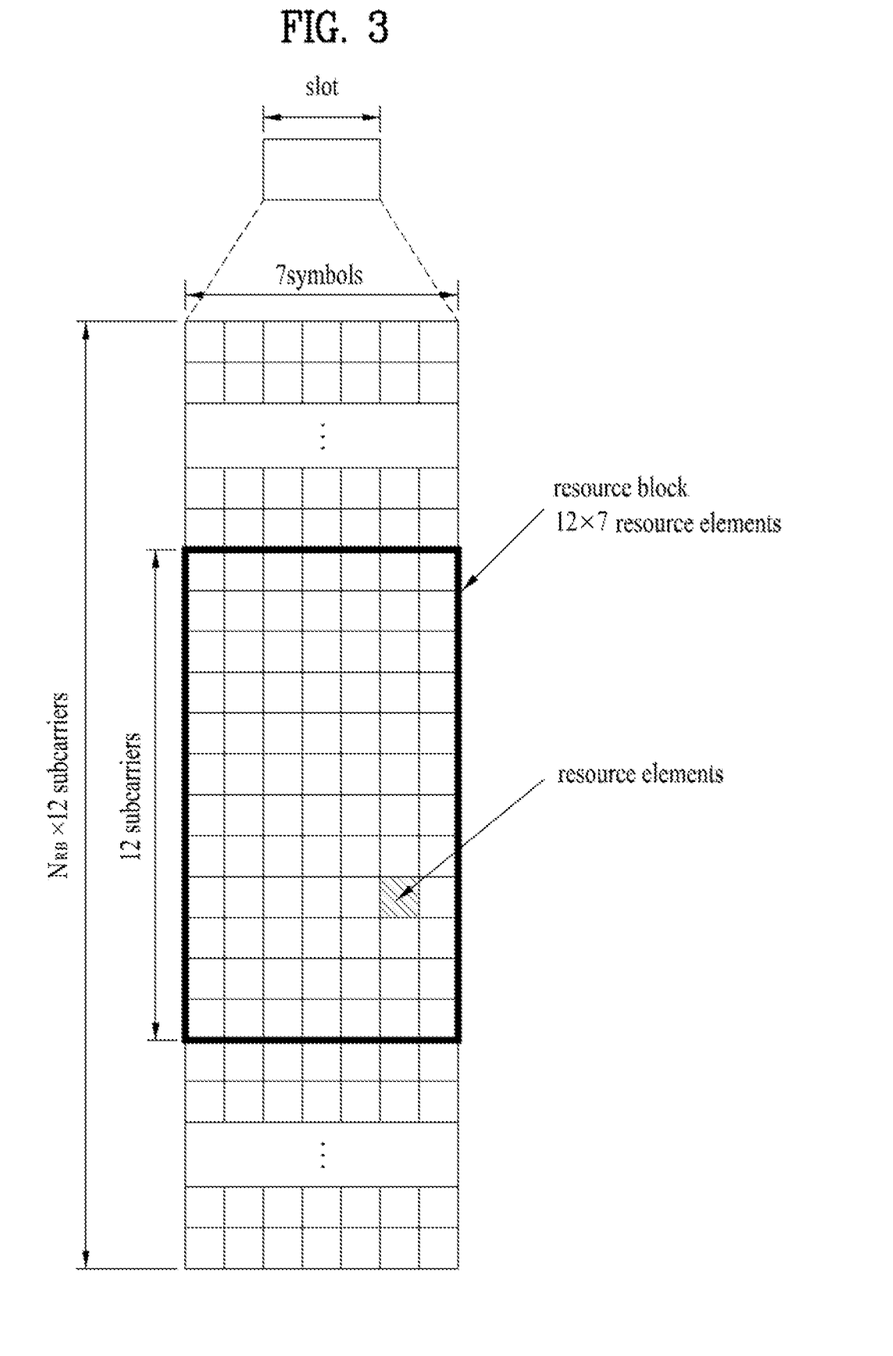
FIG. 3 illustrates a resource grid of a downlink slot.

FIG. 3 illustrates a resource grid of a DL slot.

Referring to FIG. 3, a DL slot includes a plurality of OFDMA (or OFDM) symbols in the time domain. One DL slot may include 7(6) OFDMA symbols according to cyclic prefix (CP) length, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of a UL slot may be same as that of the DL slot except that OFDMS symbols by replaced by SC-FDMA symbols.

Figure 4:
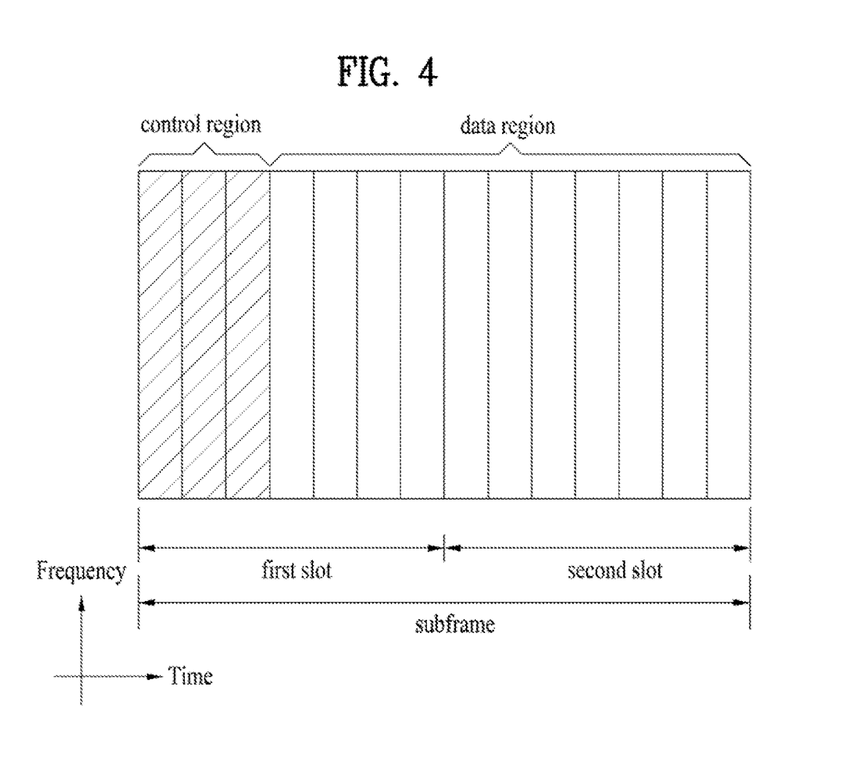
FIG. 4 illustrates a downlink subframe structure.

FIG. 4 illustrates a DL subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of DL control channels include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ-ACK signal.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. Downlink control information (DCI) is transmitted through the PDCCH. DCI formats 0/4 (referred to as UL DCI formats hereinafter) for UL scheduling (or UL grant (UG)) and DCI formats 1/1A/1B/1C/1D/2/2A/2B/2C/2D (referred to as DL DCI formats) DL scheduling are defined. The DCI formats selectively include information such as hopping flag, RB allocation, MCS (Modulation Coding Scheme), RV (Redundancy Version), NDI (New Data Indicator), TPC (Transmit Power Control), DMRS (Demodulation Reference Signal) cyclic shift, etc. as necessary.

A plurality of PDCCHs can be transmitted within a control region. A UE monitors the plurality of PDCCHs per subframe in order to check a PDCCH destined therefor. The PDCCH is transmitted through one or more control channel elements (CCEs). A PDCCH coding rate may be controlled by the number of CCEs (i.e. CCE aggregation level) used for PDCCH transmission. A CCE includes a plurality of resource element groups (REGs). A format of the PDCCH and the number of PDCCH bits are determined by the number of CCEs. A BS determines a PDCCH format according to DCI to be transmitted to the UE, and attaches a cyclic redundancy check (CRC) to control information. The CRC is masked with an identifier (e.g. a radio network temporary identifier (RNTI)) according to an owner or usage of the PDCCH. If the PDCCH is for a specific UE, then an identifier (e.g., cell-RNTI (C-RNTI)) of the UE may be masked to the CRC. If the PDCCH is for a paging message, then a paging identifier (e.g., paging-RNTI (P-RNTI)) may be masked to the CRC. If the PDCCH is for system information (more specifically, a system information block (SIB)), then a system information RNTI (SI-RNTI) may be masked to the CRC. When the PDCCH is for a random access response, then a random access-RNTI (RA-RNTI) may be masked to the CRC.

Figure 5:
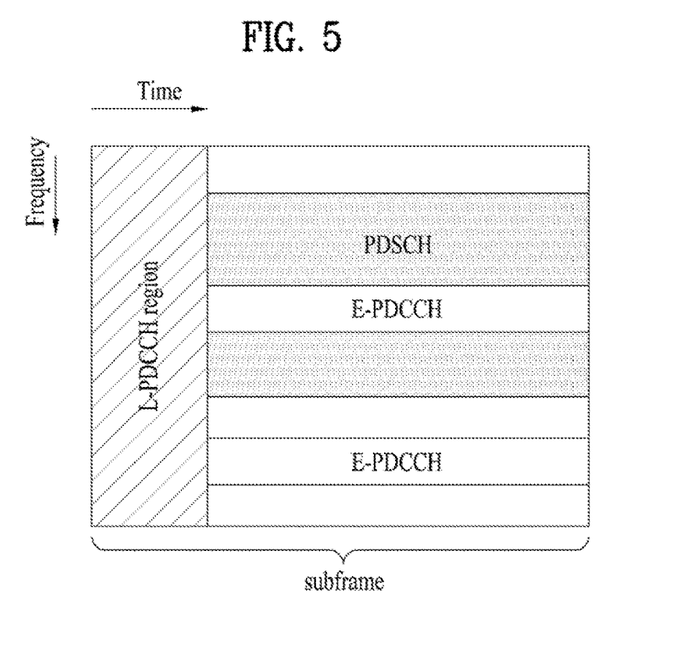
FIG. 5 illustrates an example of assigning E-PDCCH (enhanced PDCCH) to a subframe.

FIG. 5 illustrates an example of assigning E-PDCCH (enhanced PDCCH) to a subframe. A legacy LTE system has a restriction that PDCCH is transmitted via limited OFDM symbols and the like. Hence, in LTE-A, E-PDCCH (enhanced PDCCH) has been introduced for more flexible scheduling.

Referring to FIG. 5, PDCCH (for clarity, legacy PDCCH (L-PDCCH)) can be assigned to a control region (refer to FIG. 4). An L-PDCCH region may correspond to a region to which the L-PDCCH is applicable. In the context, the L-PDCCH region may correspond to a control region, a control channel resource region (i.e., a CCE resource) to which PDCCH is actually applicable in the control region, or a PDCCH search space. Meanwhile, PDCCH can be additionally assigned to a data region (refer to FIG. 4). The PDCCH assigned to the data region is referred to as E-PDCCH. As shown in the drawing, if a control channel resource is additionally secured via the E-PDCCH, it may be able to mitigate scheduling restriction due to a restricted control channel resource of the L-PDCCH region. E-PDCCH and PDSCH are multiplexed using a FDM (frequency division multiplexing) scheme in the data region.

Figure 6:
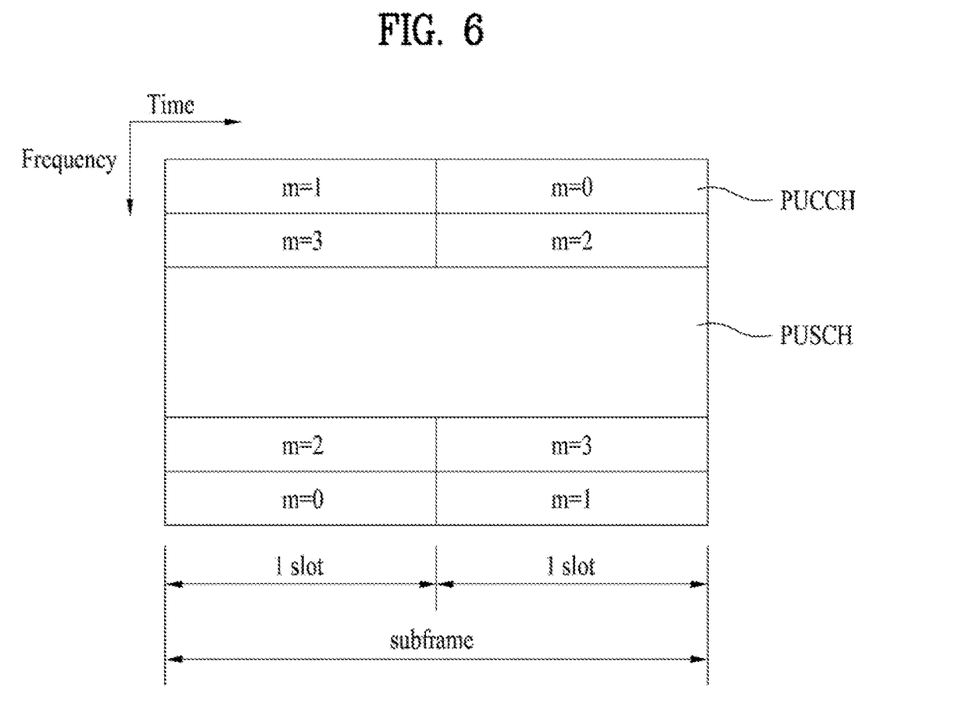
FIG. 6 illustrates an example of a structure of an uplink subframe.

FIG. 6 illustrates a UL subframe structure.

Referring to FIG. 6, a UL subframe includes a plurality of (e.g. 2) slots. A slot may include different numbers of SC-FDMA symbols according to CP lengths. The UL subframe is divided into a control region and a data region in the frequency domain. The data region is used to carry a data signal such as audio data through a physical uplink shared channel (PUSCH). The control region is used to carry uplink control information (UCI) through a physical uplink control channel (PUCCH). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ-ACK: This is an acknowledgement signal for a DL signal (e.g. a PDSCH or SPS release PDCCH). For example, a 1-bit ACK/NACK signal is transmitted as a response to a single DL codeword and a 2-bit ACK/NACK signal is transmitted as a response to two DL codewords.

CSI (channel state information): This is feedback information about a DL channel. The CSI includes a CQI (channel quality indicator), RI (rank indicator), PMI (precoding matrix indicator), PTI (precoding type indicator), etc.

Table 2 shows the mapping relationship between PUCCH formats and UCI in LTE(-A).

TABLE 2

| PUCCH format | UCI (Uplink Control Information) |
|---|---|
| Format 1 | SR (Scheduling Request) (non-modulated waveform) |
| Format 1a | |
| Format 1b | 1-bit HARQ ACK/NACK (SR exist/non-exist) |
| Format 2 | 2-bit HARQ ACK/NACK (SR exist/non-exist) |
| Format 2 | CSI (20 coded bits) |
| Format 2a | CSI and 1- or 2-bit HARQ ACK/NACK (20 bits) |
| Format 2b | (corresponding to only extended CP) |
| Format 3 (LTE-A) | CSI and 1-bit HARQ ACK/NACK (20 + 1 coded bits) |
| | CSI and 2-bit HARQ ACK/NACK (20 + 2 coded bits) |
| | HARQ ACK/NACK + SR (48 coded bits) |

Figure 7:
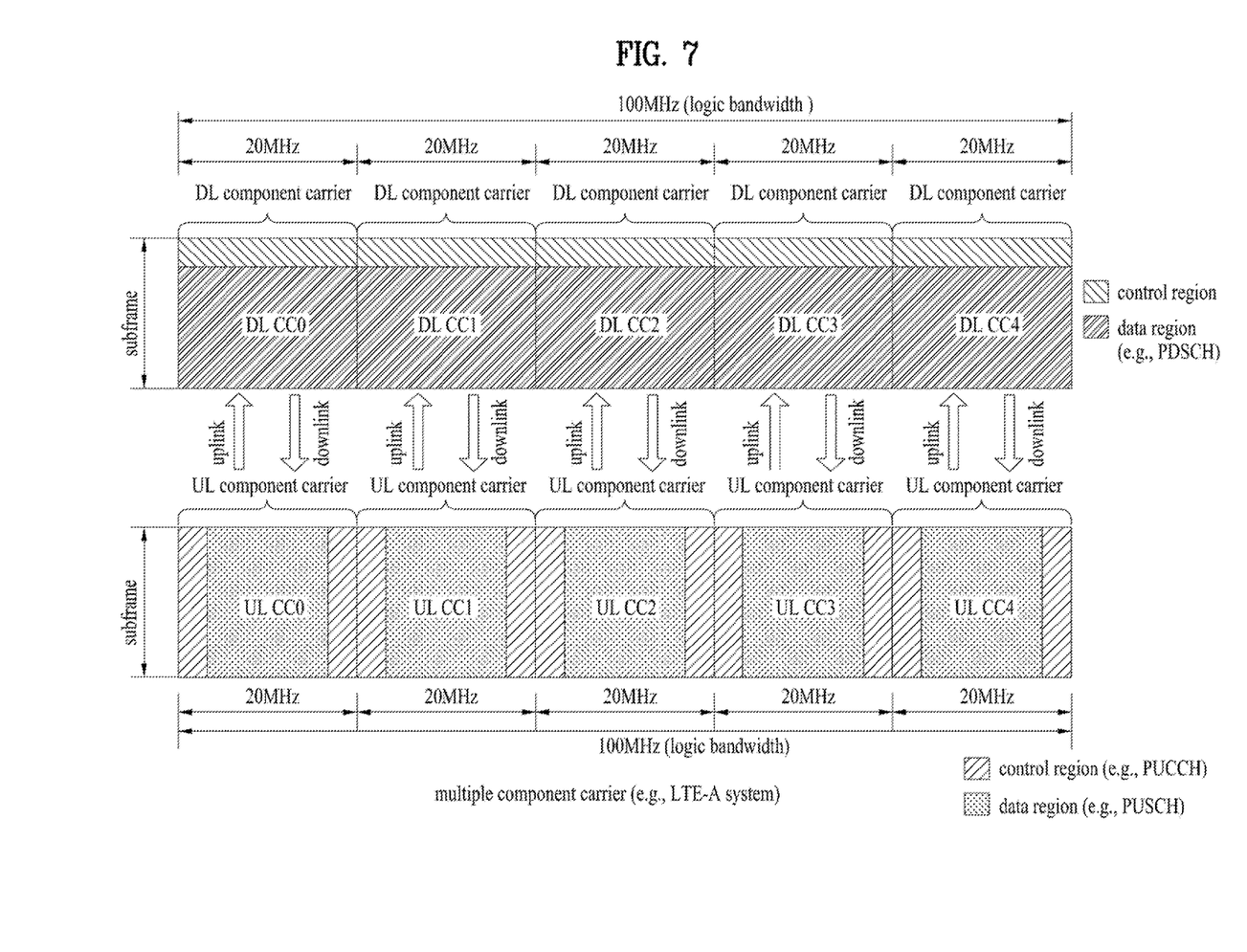
FIG. 7 illustrates an example of a CA-based wireless communication system.

FIG. 7 illustrates a carrier aggregation (CA)-based wireless communication system. To use a wider frequency band, an LTE-A system employs CA which aggregates a plurality of UL/DL frequency blocks to obtain a wider UL/DL bandwidth although an LTE system supports only a single DL/UL frequency block. Each frequency block is transmitted using a component carrier (CC). The CC may be regarded as a carrier frequency (or center carrier, center frequency) for the frequency block.

Referring to FIG. 7, according to CA, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link may be fixed or semi-statically configured in the system. Even if the system bandwidth is configured with N CCs, a frequency band that a specific UE can use may be limited to L (<N) CCs. Various parameters with respect to CA may be set cell-specifically, UE-group-specifically, or UE-specifically. Control information may be transmitted/received only through a specific CC. This specific CC may be referred to as a primary CC (PCC) (or anchor CC) and other CCs can be referred to as secondary CCs (SCCs).

In LTE-A, the concept of a cell is used to manage radio resources. A cell is defined as a combination of DL resources and UL resources. Yet, the UL resources are not mandatory. Therefore, a cell may be composed of DL resources only or both DL resources and UL resources. The linkage between the carrier frequencies (or DL CCs) of DL resources and the carrier frequencies (or UL CCs) of UL resources may be indicated by system information when CA is supported. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and one or more SCells, for a UE in an RRC_CONNECTED state, for which CA is set.

The above description (FIGS. 1 to 6) is applicable to each CC (or cell) when a plurality of CCs (or cells) is aggregated unless otherwise mentioned. In addition, a CC may be used interchangeably with a serving CC, a serving carrier, a cell, a serving cell, etc.

When a plurality of CCs is configured, cross-CC scheduling and non-cross-CC scheduling may be used. Non-cross-CC scheduling corresponds to scheduling in LTE. When cross-CC scheduling is applied, a DL grant PDCCH may be transmitted on DL CC#0 and a PDSCH corresponding thereto may be transmitted on DL CC#2. Similarly, a UL grant PDCCH may be transmitted on DL CC#0 and a PUSCH corresponding thereto may be transmitted on DL CC#4. For cross-CC scheduling, a carrier indicator field (CIF) is used. Presence or absence of a CIF in a PDCCH may be semi-statically and UE-specifically (or UE-group-specifically) configured through higher layer signaling (e.g. RRC signaling).

Scheduling according to the CIF may be arranged as follows.
  CIF disabled: a PDCCH on a DL CC is used to allocate a PDSCH resource on the same DL CC or a PUSCH resource on a linked UL CC.
  CIF enabled: a PDCCH on a DL CC can be used to allocate a PDSCH or PUSCH resource on a specific DL/UL CC from among a plurality of aggregated DL/UL CCs using the CIF.

When the CIF is present, the BS may allocate a monitoring DL CC to reduce blind detection complexity of the UE. For PDSCH/PUSCH scheduling, the UE may detect/decode a PDCCH only on the corresponding DL CCs. In addition, the BS may transmit a PDCCH only through the monitoring DL CC (set). The monitoring DL CC set may be UE-specifically, UE-group-specifically or cell-specifically configured.

Figure 8:
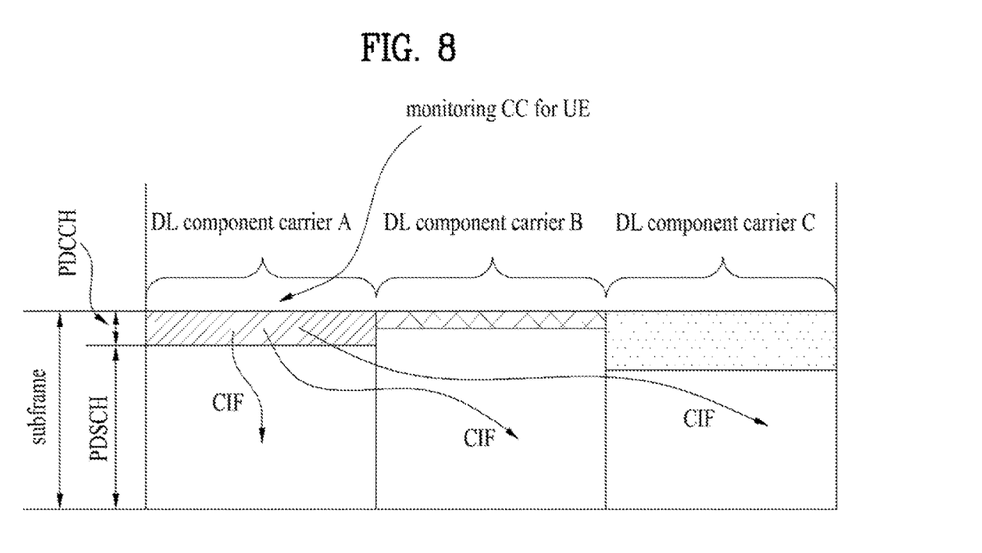
FIG. 8 illustrates an example for a scheduling method in case of configuring a plurality of cells.
Figure 9:
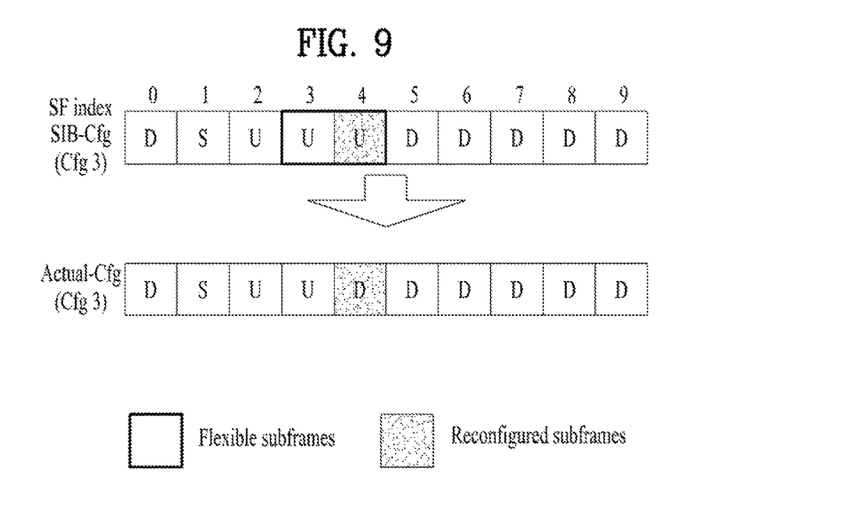
FIG. 9 illustrates an example of U=>D reconfiguration in an eIMTA cell.

FIG. 8 illustrates cross-carrier scheduling. While the figure shows DL scheduling, cross-carrier scheduling is equally applied to UL scheduling.

Referring to FIG. 8, 3 DL CCs are configured for a UE, and DL CC A may be set as a PDCCH monitoring DL CC. When the CIF is disabled, each DL CC can transmit only a PDCCH that schedules a PDSCH corresponding to the DL CC without a CIF according to LTE PDCCH rule. When the CIF is enabled, DL CC A (i.e. MCC) can transmit not only a PDCCH that schedules the PDSCH corresponding to the DL CC A but also PDCCHs that schedule PDSCHs of other DL CCs using the CIF. In this case, a PDCCH is not transmitted in DL CC B/C.

Here, a specific CC (or cell) used to transmit scheduling information (e.g. PDCCH) is referred to as "monitoring CC (MCC)" which may be replaced by "monitoring carrier", "monitoring cell", "scheduling carrier", "scheduling cell", "scheduling CC", etc. A DL CC on which a PDSCH corresponding to a PDCCH is transmitted and a UL CC on which a PUSCH corresponding to a PUCCH is transmitted may be referred to as a scheduled carrier, a scheduled CC, a scheduled cell, etc. One or more scheduling CCs may be configured per UE. A scheduling CC may include a PCC. When only one scheduling CC is configured, the scheduling CC may be the PCC. The scheduling CC may be UE-specifically, UE-group-specifically or cell-specifically set.

In case of cross-CC scheduling, signal transmission may be performed as follows.
  PDCCH (UL/DL grant): scheduling CC (or MCC)
  PDSCH/PUSCH: CC indicated by a CIF of a PDCCH detected from a scheduling CC
  DL ACK/NACK (e.g. PHICH): scheduling CC (or MCC) (e.g. DL PCC)
  UL ACK/NACK (e.g. PUCCH): UL PCC
  * In the following description, DL ACK/NACK may be referred to as DL A/N or PHICH and UL ACK/NACK may be referred to as UL A/N or A/N for convenience.

It is able to aggregate not only a plurality of CCs including a different SF configuration but also a plurality of CCs including an identical SF configuration with each other. For example, when a plurality of CCs including a different SF configuration are aggregated with each other, it may include aggregation of a plurality of CCs to which a different UL-DL configuration is set (for clarity, it is referred to as a different TDD CA) and aggregation of a TDD CC and a FDD CC.

When a plurality of CCs including a different SF configuration are aggregated with each other, it may also be able to support cross-CC scheduling. In this case, UL grant/PHICH timing (refer to FIGS. 5 to 6) respectively set to MCC and SCC may be different from each other. Hence, in order to perform UG/PHICH transmission for UL data, which is transmitted via SCC UL SF on which cross-CC scheduling is performed via MCC UL SF and MCC, it may be able to consider a method of applying identical or different UG/PHICH timing (set to a specific UL-DL configuration) according to each CC or a method of commonly applying UG/PHICH timing set to a specific UL-DL configuration to all CCs (i.e., PCC (or MCC)/SCC). A specific UL-DL configuration (hereinafter, reference configuration (ref-cfg)) can be determined by UL-DL configuration identical to UL-DL configuration (MCC-cfg) set to PCC (or MCC) or UL-DL configuration (SCC-cfg) set to SCC, or a different UL-DL configuration. In this case, the UG or the PHICH timing may correspond to D configured to transmit/receive UG for scheduling UL data of a specific U and PHICH for transmitting the UL data. Or, the UG or the PHICH timing may correspond to timing relationship between the UG and the PHICH timing. Specifically, when UL grant set to a specific CC (i.e., Ref-CC) or a specific UD-cfg (i.e., Ref-cfg) is applied or PHICH timing is applied, it may indicate that a parameter value corresponding to a UD-cfg of a specific CC or a specific UD-cfg is used.

Embodiment: Signal Transmission and Reception when Subframe is Dynamically Reconfigured In a next system appearing after LTE, a scheme of reconfiguring/changing UL/DL SF direction is considered to perform enhanced interference mitigation and traffic adaptation (i.e., eIMTA) and the like in a TDD situation. To this end, a basic UL-DL configuration (UD-cfg) of a TDD cell (or CC) is (semi-)statically configured using higher layer signaling (e.g., SIB) and an operation UD-cfg of the cell (or CC) can be dynamically reconfigured/changed using lower layer signaling (e.g., L1 (layer 1) signaling (e.g., PDCCH)). For clarity, the basic UD-cfg is referred to as an SIB-cfg and the operation UD-cfg is referred to as an actual-cfg. A subframe configuration according to the UD-cfg is configured based on Table 1. And, in the present invention, a DL SF, a UL SF, and a special SF are referred to as D, U, and S, respectively.

In relation to this, in case of performing reconfiguration from D to U (or S), when DL reception/measurement of a legacy UE using a CRS is considered in the D, it may be difficult to perform the DL reception/measurement or it may cause deterioration. On the contrary, in case of performing reconfiguration from U (or S) to D, if an eNB does not schedule or configure a UL signal capable of being transmitted by a legacy UE via the U on purpose, it may be able to provide an additional DL resource to an eIMTA UE.

In consideration of this, the actual-cfg can be selectively determined from among the UD-cfg (including SIB-cfg) including all Ds on the SIB-cfg. In particular, although the UD-cfg of which all Ds are arranged to a D position on the SIB-cfg can be determined as the actual-cfg, it is difficult to determine UD-cfg of which U is assigned to a D position on the SIB-cfg as the actual-cfg. Meanwhile, in order to set HARQ timing (e.g., HARQ-ACK feedback transmission timing) for DL scheduling, it may be able to separately configure a reference UD-cfg (hereinafter, D-ref-cfg) in an eIMTA via a higher layer (signaling). The actual-cfg can be selectively determined from among UD-cfgs (including the D-ref-cfg) including all Us on the D-ref-cfg only in consideration of the separately configured reference UD-cfg. Hence, it is difficult to determine UD-cfg of which D is assigned to a U position on the D-ref-cfg as the actual-cfg.

Hence, the D-ref-cfg is configured as a UD-cfg including all Ds on available actual-cfg candidates and the SIB-afg is configured as a UD-cfg including all Us on available actual-cfg candidates. In particular, the D-ref-cfg is configured as a D super set UD-cfg for the available actual-cfg candidates and the SIB-cfg can be configured as a U superset UD-cfg for the available actual-cfg candidates. A reference UD-cfg (hereinafter, U-ref-cfg) of HARQ timing (e.g., UG/PUSCH/PHICH transmission timing) for UL scheduling can be configured as SIB-cfg. Hence, U on the D-ref-cfg and D on the SIB-cfg can be considered as a fixed U and a fixed D, respectively. Hence, if an SF corresponds to D on the D-ref-cfg and U on the SIB-cfg, the SF can be considered as a flexible U only capable of being reconfigured/changed from U to D. The flexible U can be reconfigured/changes to D from U by the actual-cfg.

Consequently, after the SIB-cfg/D-ref-cfg is configured via a higher layer (signaling), one of UD-cfg(s) including all Ds on the SIB-cfg and including all Us on the D-ref-cfg can be configured as the actual-cfg via L1 signaling.

Table 3 shows available actual-cfg candidates (bold) in case of setting as [SIB-cfg=UD-cfg#3, D-ref-cfg=UD-cfg#5].

TABLE 3

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 (SIB-cfg) | D | S | U | U | U | D | D | D | D | D |
| 4 | D | S | U | U | D | D | D | D | D | D |
| 5 (D-ref-cfg) | D | S | U | D | D | D | D | D | D | D |
| 6 | D | S | U | U | U | D | S | U | U | D |

Table 4 shows a fixed U (diagonal line) and a flexible U (underline) in case of setting as [SIB-cfg=UD-cfg#3, D-ref-cfg=UD-cfg#5].

TABLE 4

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 3 (SIB-cfg) | D | S | U | U | U | D | D | D | D | D |
| 4 | D | S | U | U | D | D | D | D | D | D |
| 5 (D-ref-cfg) | D | S | U | D | D | D | D | D | D | D |

Table 5 shows all flexible Us (underline) available according to SIB-cfg. An actual flexible U can be provided as a subset of a hatched part according to D-ref-cfg.

TABLE 5

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | _U_ | _U_ | D | S | _U_ | _U_ | _U_ |
| 1 | D | S | U | _U_ | D | D | S | _U_ | _U_ | D |
| 2 | D | S | U | D | D | D | S | _U_ | D | D |
| 3 | D | S | U | _U_ | _U_ | D | D | D | D | D |
| 4 | D | S | U | _U_ | D | D | D | D | D | D |
| 5 | D | S | U | D | D | D | D | D | D | D |
| 6 | D | S | U | _U_ | _U_ | D | S | _U_ | _U_ | D |

Meanwhile, in a situation that a UE performs carrier aggregation (i.e., CA) on a plurality of cells, a case that simultaneous transmission and reception are not permitted or impossible in a plurality of the cells may occur due to an interval between frequency bands to which each cell belongs thereto, a hardware configuration of the UE itself, or indication of an eNB, or the like. Hence, if SFs including a different transmission direction are collided with each other at the same time among a plurality of the cells, it may be able to control signal transmitted and received in a plurality of the cells in a manner of prioritizing an SF of a specific cell or specific transmission direction. As an example, signal transmission and reception of a UE can be restricted when simultaneous transmission and reception is restricted in a situation in which CA is performed among a plurality of cells including a different UD-cfg. In this case, the signal transmission ad reception of the UE can be controlled in a manner of prioritizing a Pcell SF (transmission direction).

1) If D of a Pcell and U or S of an Scell are collided with each other in an identical subframe, all UL signal transmissions are restricted in the Scell of the subframe.

2) If U of the Pcell and D of the Scell are collided with each other in an identical subframe, all DL signal receptions are restricted in the Scell of the subframe.

3) If S of the Pcell and D of the Scell are collided with each other in an identical subframe, reception of a legacy control channel such as PCFICH/PFICH/PDCCH signal is permitted only in the Scell of the subframe and reception of a PDSCH/EPDCCH/PMCH (physical multicast channel)/PRS (positioning reference signal) signal can be restricted in the Scell.

Meanwhile, in an eIMTA, SF transmission direction of a TDD cell can be dynamically changed. If simultaneous transmission and reception of a UE is restricted in a CA situation including a cell to which the eIMTA is applied (hereinafter, eIMTA cell), it is necessary to regulate a method of controlling signal transmission and reception of a plurality of cells. Hence, in the following, the present invention proposes a method of transmitting and receiving a signal for a case that simultaneous transmission and reception of a UE is restricted in a CA situation including the eIMTA cell. Specifically, similar to the aforementioned description, when transmission and reception of signals of a plurality of cells are controlled in a manner of prioritizing PCell SF (transmission direction), whether or not transmission directions of a plurality of the cells are collided with each other can be determined based on SIB-cfg in case of a cell to which the eIMTA is not applied. On the contrary, in case of a cell to which the eIMTA is applied, whether or not transmission directions of a plurality of the cells are collided with each other can be determined based on actual-cfg. In case of determining whether or not collision occurs, an SF configuration of the eIMTA cell may follow SIB-cfg, D-ref-cfg, U-ref-cfg, or actual-cfg. Or, an eNB is able to make the SF configuration follow UD-cfg as an option. Yet, since the eIMTA is configured for the purpose of DL/UL traffic adaptation, it is preferable to determine whether or not a collision occurs according to the actual-cfg.

In the following, an example for a method of transmitting and receiving a signal according to an eIMTA application situation is explained. In the following example, a cell with eIMTA corresponds to a cell to which the eIMTA is applied (i.e., eIMTA cell) and a cell w/o (without) eIMTA corresponds to a cell to which the eIMTA is not applied.

Case T1) TDD Pcell with eIMTA+TDD Scell with or w/o eIMTA

A UE may operate as follows according to whether or not an eIMTA of SCell is applied.

1) If D on actual-cfg of a Pcell is collided with U or S on actual-cfg of an SCell (SCell with eIMTA) or if D on actual-cfg of the Pcell is collided with U or S on SIB-cfg of the SCell (SCell w/o eIMTA) at the same timing (e.g., subframe), UL transmission can be restricted in the Scell at the timing.

2) If U on actual-cfg of the Pcell is collided with D on actual-cfg of an SCell (SCell with eIMTA) or if U on actual-cfg of the Pcell is collided with D on SIB-cfg of the SCell (SCell w/o eIMTA) at the same timing, DL reception can be restricted in the Scell at the timing.

3) If S on actual-cfg of the Pcell is collided with D on actual-cfg of the SCell (SCell with eIMTA) or if S on actual-cfg of the Pcell is collided with D on SIB-cfg of the SCell (SCell w/o eIMTA) at the same timing, PCFICH/PHICH/PDCCH reception is permitted only in the Scell and PDSCH/EPDCCH/PMCH/PRS reception can be restricted in the Scell at the timing.

Meanwhile, if an SF configuration (e.g., D, U or S) on actual-cfg of the Pcell and an SF configuration on actual-cfg (SCell with eIMTA) or an SF configuration on SIB-cfg (SCell w/o eIMTA) of the Scell are matched with each other at the same timing, a signal transmission and reception operation can be performed in the two cells according to the SF configuration on the actual-cfg (SCell with eIMTA) or the SF configuration on the SIB-cfg (SCell w/o eIMTA) of each cell without any separate restriction irrespective of SF configuration on SIB-cfg of each cell. Meanwhile, in case of the "Pcell with eIMTA+Scell w/o eIMTA", in order to support a more simple/stable (UL PUSCH) HARQ process operation in the Scell, the "SF configuration on actual-cfg of the Pcell" can be replaced/considered with/as "SF configuration on D-ref-cfg or actual-cfg of the Pcell". In other word, a signal transmission and reception operation can be performed without any separate restriction only when the SF configuration (e.g., D, U or S) on D-ref-cfg of the Pcell, the SF configuration on actual-cfg of the Pcell, and the SF configuration on SIB-cfg of the Scell are matched with each other.

Case T2) TDD Pcell w/o eIMTA+TDD Scell with or w/o eIMTA

A UE may operate as follows according to whether or not an eIMTA of SCell is applied.

1) If D on SIB-cfg of a Pcell is collided with U or S on actual-cfg of an SCell (SCell with eIMTA) or if D on SIB-cfg of the Pcell is collided with U or S on SIB-cfg of the SCell (SCell w/o eIMTA) at the same timing (e.g., subframe), UL transmission can be restricted in the Scell at the timing.

2) If U on SIB-cfg of the Pcell is collided with D on actual-cfg of an SCell (SCell with eIMTA) or if U on SIB-cfg of the Pcell is collided with D on SIB-cfg of the SCell (SCell w/o eIMTA) at the same timing, DL reception can be restricted in the Scell at the timing.

3) If S on SIB-cfg of the Pcell is collided with D on actual-cfg of the SCell (SCell with eIMTA) or if S on SIB-cfg of the Pcell is collided with D on SIB-cfg of the SCell (SCell w/o eIMTA) at the same timing, PCFICH/PHICH/PDCCH reception is permitted only in the Scell and PDSCH/EPDCCH/PMCH/PRS reception can be restricted in the Scell at the timing.

If an SF configuration (e.g., D, U or S) on SIB-cfg of the Pcell is matched with an SF configuration on actual-cfg (SCell with eIMTA) or an SF configuration on SIB-cfg (SCell w/o eIMTA) of the Scell at the same timing, a signal transmission and reception operation can be performed in the two cells according to the SF configuration on the actual-cfg (SCell with eIMTA) or the SF configuration on the SIB-cfg (SCell w/o eIMTA) of each cell without any separate restriction irrespective of SF configuration on SIB-cfg of each cell.

Case F1) TDD PCell with or w/o eIMTA+FDD SCell

A UE may operate as follows according to whether or not an eIMTA of PCell is applied.

1) If D on actual-cfg of a Pcell is collided with U of an SCell (PCell with eIMTA) or if D on SIB-cfg of the Pcell is collided with U of the SCell (PCell w/o eIMTA) at the same timing (e.g., subframe), UL transmission can be restricted in the Scell at the timing.

2) If U on actual-cfg of the Pcell is collided with D of an SCell (PCell with eIMTA) or if U on SIB-cfg of the Pcell is collided with D of the SCell (PCell w/o eIMTA) at the same timing (e.g., subframe), DL reception can be restricted in the Scell at the timing.

3) If S on actual-cfg of the Pcell is collided with D of the SCell (PCell with eIMTA) or if S on SIB-cfg of the Pcell is collided with D of the SCell (PCell w/o eIMTA) at the same timing (e.g., subframe), PCFICH/PHICH/PDCCH reception is permitted only in the Scell and PDSCH/EPDCCH/PMCH/PRS reception can be restricted in the Scell at the timing.

4) If S on actual-cfg of the PCell is collided with U of the Scell (Pcell with eIMTA) or if S on SIB-cfg of the Pcell is collided with U of the Scell (PCell w/o eIMTA) at the same timing (e.g., subframe), i) all UL transmissions are restricted in the Scell or ii) SRS transmission is permitted only and PRACH/PUSCH/PUCCH transmission can be restricted in the Scell at the timing.

Case F2) FDD Pcell+TDD Scell with or w/o eIMTA

A UE may operate as follows according to whether or not an eIMTA of SCell is applied.

1) If D of a Pcell is collided with U or S on actual-cfg of an SCell (SCell with eIMTA) or if D of the Pcell is collided with U or S on SIB-cfg of the SCell (SCell w/o eIMTA) at the same timing (e.g., subframe), UL transmission can be restricted in the Scell at the timing.

2) If U of the Pcell is collided with D or S on actual-cfg of the SCell (SCell with eIMTA) or if U of the Pcell is collided with D or S on SIB-cfg of the SCell (SCell w/o eIMTA) at the same timing (e.g., subframe), DL reception can be restricted in the Scell at the timing.

Figure 10:
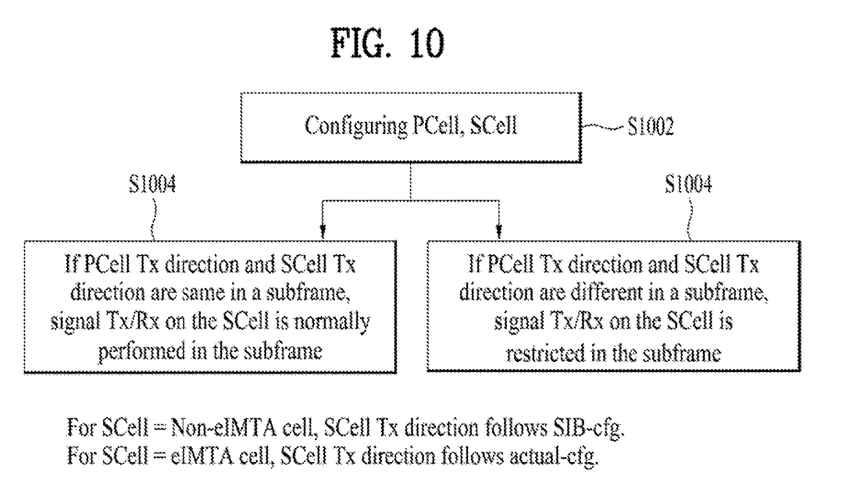
FIG. 10 illustrates a signal transmission and reception procedure according to the present invention.

FIG. 10 illustrates an example of a signal transmission and reception procedure according to the present invention when eIMTA is applied. FIG. 10 corresponds to Case T1, T2, and F2. A signal transmission and reception procedure can also be applied to Case F1 using a similar scheme.

Referring to FIG. 10, a UE can configure a PCell and an SCell [S1002]. In this case, one or more SCells can be configured. Subsequently, the UE can perform a procedure for transmitting and receiving a signal in each subframe. In this case, if transmission directions of the PCell and the SCell are identical to each other in a subframe, the UE can normally perform signal transmission and reception in the SCell of the subframe [S1004]. On the contrary, if the transmission directions of the PCell and the SCell are different from each other in the subframe, the UE may set a limit on transmitting and receiving a signal in the SCell of the subframe [S1006]. In this case, if the SCell is not an eIMTA cell, transmission direction of the SCell is defined according to UL-DL information in SIB. If the SCEll corresponds to the eIMTA cell, the transmission direction of the SCell can be defined according to UL-DL configuration information of PDCCH.

Although the method proposed by the present invention has been explained centering on a CA situation including an eIMTA TDD cell, the method can also be identically/similarly applied to a CA situation including an eIMTA FDD cell. Specifically, if all or a part of UL SFs on a UL carrier is reconfigured into a DL SF (and/or a special SF) in the eIMTA FDD cell, an identical principle can be applied in a state that an SF configuration on the reconfigured UL carrier is considered/replaced as/with actual-cfg.

Figure 11:
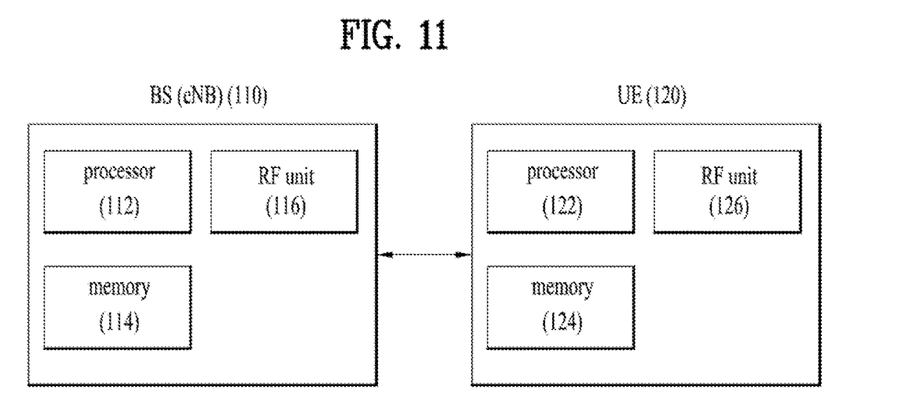
FIG. 11 illustrates a base station and a user equipment applicable to an embodiment of the present invention.

FIG. 11 illustrates a BS and a UE of a wireless communication system, which are applicable to embodiments of the present invention. When the wireless communication system includes a relay, the BS or UE can be replaced by the relay.

Referring to FIG. 11, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, BS or other apparatuses (e.g. a relay) of a wireless communication apparatus. Specifically, the present invention is applicable to a method for transmitting control information and an apparatus for the same.

What is claimed is:

1. A method of controlling transmission and reception of a signal, which is controlled by a user equipment in a situation in which simultaneous transmission and reception is restricted in a plurality of cells in a wireless communication system, the method comprising:
configuring an TDD (time division duplex) PCell (primary cell) and an TDD SCell (secondary cell); and
if transmission direction of the TDD PCell and transmission direction of the TDD SCell are different from each other in a subframe, restricting signal transmission and reception on the TDD SCell of the subframe,
wherein if the TDD SCell is not an eIMTA (enhanced interference mitigation and traffic adaptation) cell, the restricting signal transmission and reception on the TDD SCell of the subframe is performed based on a first UL-DL (uplink-downlink) configuration indicated by an SIB (system information block), and
wherein if the TDD SCell corresponds to the eIMTA cell, a first reference UL-DL configuration used for HARQ-ACK (hybrid ARQ acknowledgement) transmission and a second reference UL-DL configuration used for PUSCH (physical uplink shared channel) transmission are further configured for the TDD SCell by an RRC (radio resource control) signaling and a second UL-DL configuration used for UL-DL reconfiguration is further indicated for the TDD SCell by a PDCCH (physical downlink control channel), and the restricting signal transmission and reception on the TDD SCell of the subframe is performed based on the second UL-DL configuration among the first and second UL-DL configurations, and the first and second reference UL-DL configurations.

2. The method of claim 1, wherein if the TDD PCell corresponds to a DL subframe and the TDD SCell corresponds to a UL subframe or a special subframe in the subframe, UL signal transmission is restricted in the TDD SCell of the subframe.

3. The method of claim 1, wherein if the TDD PCell corresponds to a UL subframe and the TDD SCell corresponds to a DL subframe in the subframe, DL signal reception is restricted in the TDD SCell of the subframe.

4. The method of claim 1, wherein if the TDD PCell corresponds to a special subframe and the TDD SCell corresponds to a DL subframe in the subframe, reception of a PCFICH (physical control format indicator channel), a PHICH (physical hybrid ARQ indicator channel), and a PDCCH is permitted only in the TDD SCell of the subframe.

5. The method of claim 1, wherein a subframe pattern of a cell is allocated as follows according to a UL-DL configuration of:

| Uplink-downlink configuration | Subframe number | | | | | | | | | |
| --- | --- | --- | --- | --- | --- | --- | --- | --- | --- | --- |
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

6. A UE configured to control transmission and reception of a signal in a situation in which simultaneous transmission and reception is restricted in a plurality of cells in a wireless communication system, the UE comprising:

an RF (radio frequency) unit; and a processor operatively coupled to the RF unit, the processor configured to:

configure a TDD (time division duplex) PCell (primary cell) and a TDD SCell (secondary cell), if transmission direction of the TDD PCell and transmission direction of the TDD SCell are different from each other in a subframe, restrict signal transmission and reception on the TDD SCell of the subframe, wherein if the TDD SCell is not an eIMTA (enhanced interference mitigation and traffic adaptation) cell, the restricting signal transmission and reception on the TDD SCell of the subframe is performed based on a first UL-DL (uplink-downlink) configuration indicated by an SIB (system information block), and wherein if the TDD SCell corresponds to the eIMTA cell, a first reference UL-DL configuration used for HARQ-ACK (hybrid ARQ acknowledgement) transmission and a second reference UL-DL configuration used for PUSCH (physical uplink shared channel) transmission are further configured for the TDD SCell by an RRC (radio resource control) signaling and a second UL-DL configuration used for UL-DL reconfiguration is further indicated for the TDD SCell by a PDCCH (physical downlink control channel), and the restricting signal transmission and reception on the TDD SCell of the subframe is performed based on the second UL-DL configuration among the first and second UL-DL configurations, and the first and second reference UL-DL configurations.

7. The user equipment of claim 6, wherein if the TDD PCell corresponds to a DL subframe and the TDD SCell corresponds to a UL subframe or a special subframe in the subframe, UL signal transmission is restricted in the TDD SCell of the subframe.

8. The user equipment of claim 6, wherein if the TDD PCell corresponds to a UL subframe and the TDD SCell corresponds to a DL subframe in the subframe, DL signal reception is restricted in the TDD SCell of the subframe.

9. The user equipment of claim 6, wherein if the TDD PCell corresponds to a special subframe and the TDD SCell corresponds to a DL subframe in the subframe, reception of a PCFICH (physical control format indicator channel), a PHICH (physical hybrid ARQ indicator channel), and a PDCCH is permitted only in the TDD SCell of the subframe.

10. The user equipment of claim 6, wherein a subframe pattern of a cell is allocated as follows according to a UL-DL configuration of:

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D. |

* * * * *